United States Patent [19]

Gormley

[11] Patent Number: 4,908,948
[45] Date of Patent: Mar. 20, 1990

[54] PRECISION OPTICAL SQUARE INSTRUMENT

[76] Inventor: Brendan J. Gormley, 96 Claragh Road, Cloghog Lower, Omagh, County Tyrone, Northern Ireland

[21] Appl. No.: 213,326

[22] Filed: Jun. 30, 1988

[51] Int. Cl.4 .................................. G01C 15/12
[52] U.S. Cl. ............................... 33/276; 33/276; 33/286; 33/19; 356/399; 356/146
[58] Field of Search ............... 356/144, 146, 399, 140, 356/138; 33/1 H, 1 G, 227, 228, 286, 279, 280, 282, 140, 146, 274, 276, 277

[56] References Cited

U.S. PATENT DOCUMENTS

| | | | |
|---|---|---|---|
| 974,007 | 10/1910 | Wolcott | 33/280 |
| 1,019,668 | 3/1912 | Lewis | 33/280 |
| 1,025,911 | 5/1912 | Gasser | 356/146 |
| 1,696,508 | 12/1928 | Thorburn | 356/144 |
| 3,167,864 | 2/1965 | Lange | 33/276 |
| 3,355,979 | 12/1967 | Wirtanen | 356/399 |
| 3,446,560 | 5/1969 | Brasier | 33/286 |
| 3,521,364 | 7/1970 | Metcalfe | 33/293 |
| 3,528,747 | 9/1970 | Walsh | 33/293 |
| 4,281,928 | 8/1981 | Brunson | 33/276 |
| 4,378,638 | 4/1983 | Harder | 33/293 |

Primary Examiner—Allan N. Shoap
Assistant Examiner—Thomas B. Will
Attorney, Agent, or Firm—Hopgood, Calimafde, Kalil, Blaustein & Judlowe

[57] ABSTRACT

A precision optical square instrument for accurately determining lines and planes respectively perpendicular to reference lines and planes comprising, a substantially hollow housing containing first and second reflectors arranged at different vertical positions for viewing first and second marker positions outside the housing which are substantially at right angles to each other. The images of the two marker positions are projected onto a third reflector which is viewed by a user, such that the user can determine when the two marker positions are located perpendicularly, by the alignment of the images viewed in the third reflector.

9 Claims, 6 Drawing Sheets

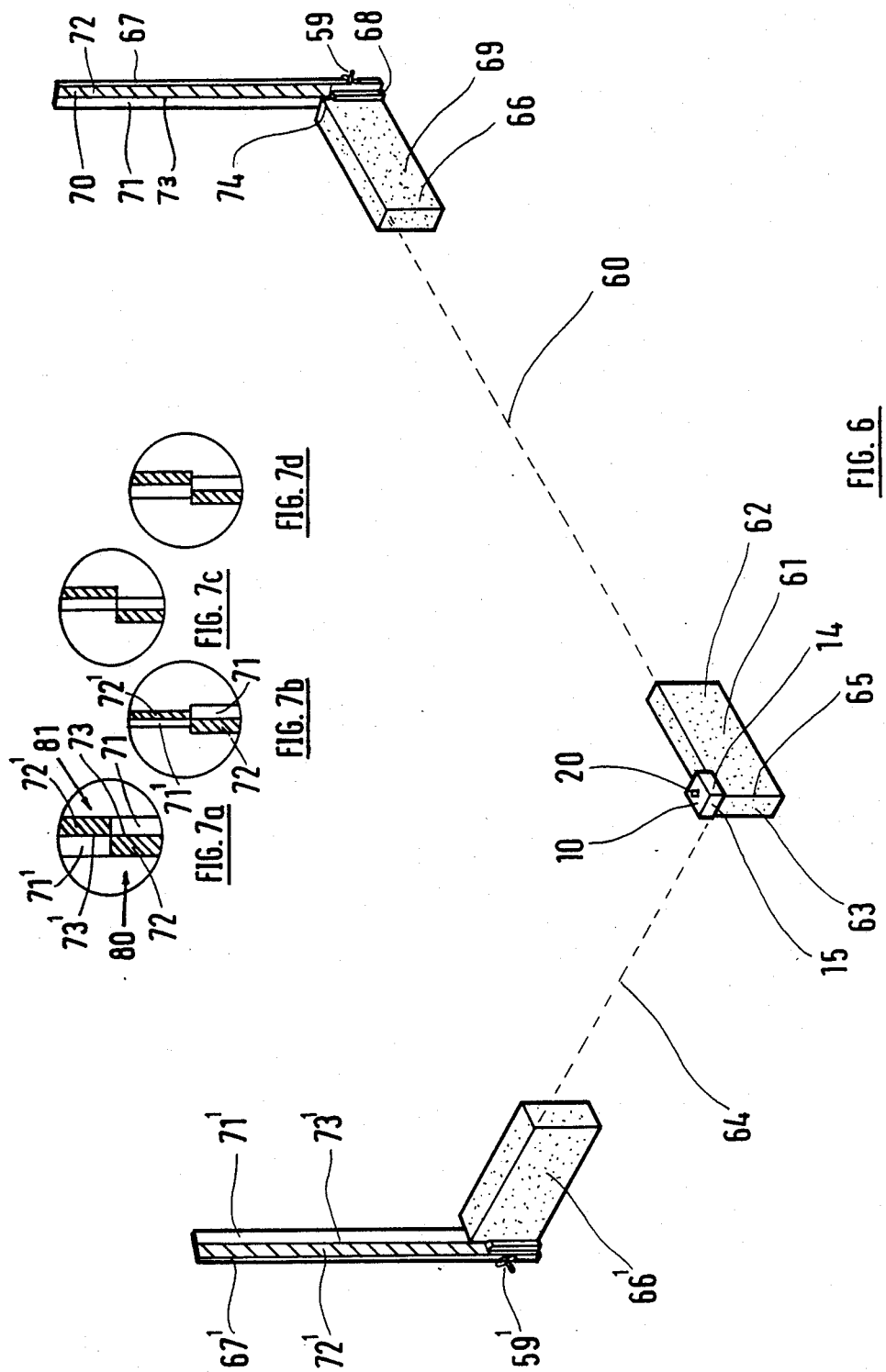

PRECISION OPTICAL SQUARE INSTRUMENT

The present invention relates to a precision optical square instrument for accurately determining lines and planes respectively perpendicular to reference lines and planes.

One known method of setting out a building site after trenches have been excavated and foundations laid, is to establish the lines of the eventual building walls above ground level by using string stretched between markers known in the trade as profiles. The locations of the eventual building corners are then transferred to the foundation by dropping a vertical line to the trenches. This method is slow and due to its nature is open to inaccuracies.

In the field of surveying, optical square instruments are known, however, one problem is that they are confined to use in open, unobstructed spaces and are either hand held or held on the end of a ranging rod thereby reducing their accuracy An optical square instrument comprising two telescopes mounted perpendicularly to one another and mounted on a tripod is also known, however, this instrument has the disadvantage that it is expensive and requires considerable space and skill to set up.

An object of the present invention is to provide a precision optical square instrument which mitigates the above problems.

According to the present invention there is provided a precision optical square instrument for accurately determining lines and planes respectively perpendicular to reference lines and planes comprising, a substantially hollow housing containing a first and second reflecting means, arranged at different vertical positions for viewing first and second marker positions outside the housing which are substantially at right angles to each other, and projecting images of the two marker positions onto third reflecting means which is viewed by a user, such that the user can determine when the two marker positions are located perpendicularly, by the alignment of the images viewed in the third reflecting means.

An embodiment of the invention will now be described, by way of example, with reference to the accompanying drawings in which;

FIG. 6, is a perspective view of the optical square instrument of FIG. 1 in use; and FIGS. 7a to 7d illustrate a selection of the images which may be seen by a user in use of the optical square instrument.

Figure 1:
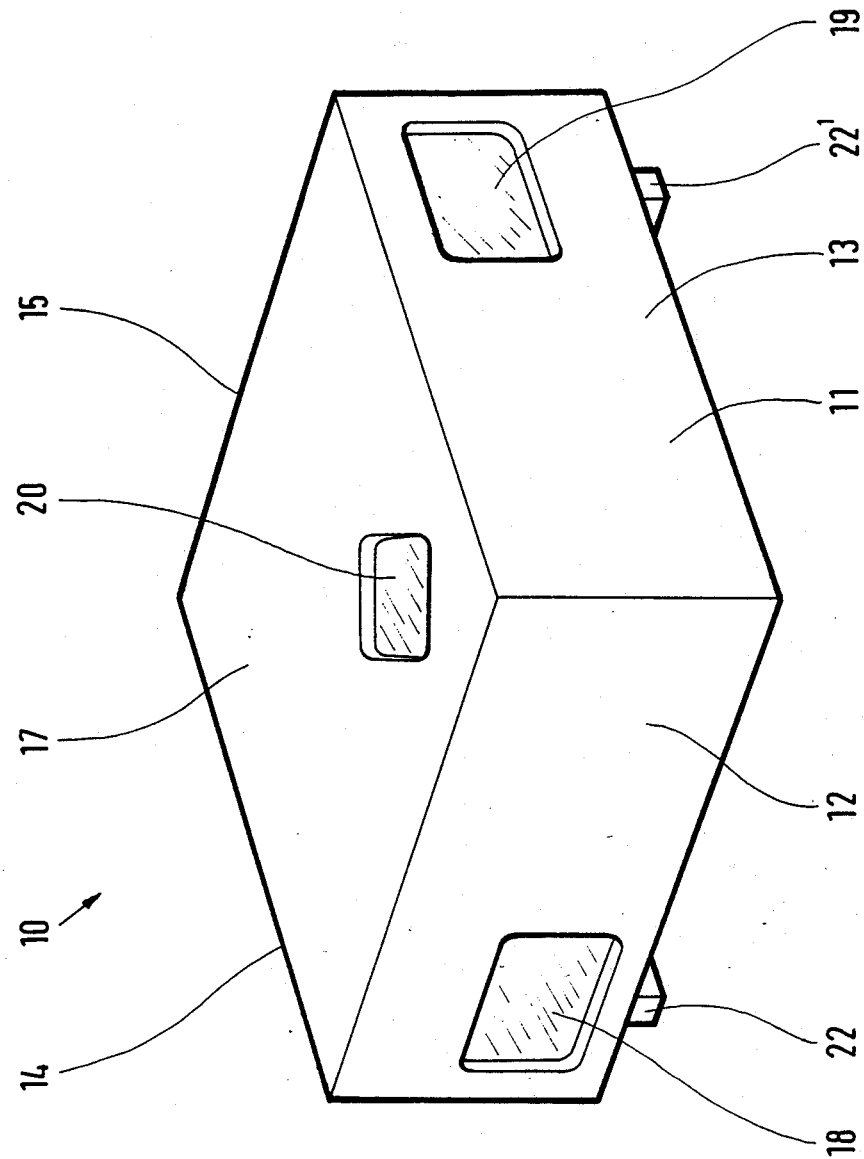
FIG. 1, is a top perspective view of a precision optical square instrument according to the invention.
Figure 2:
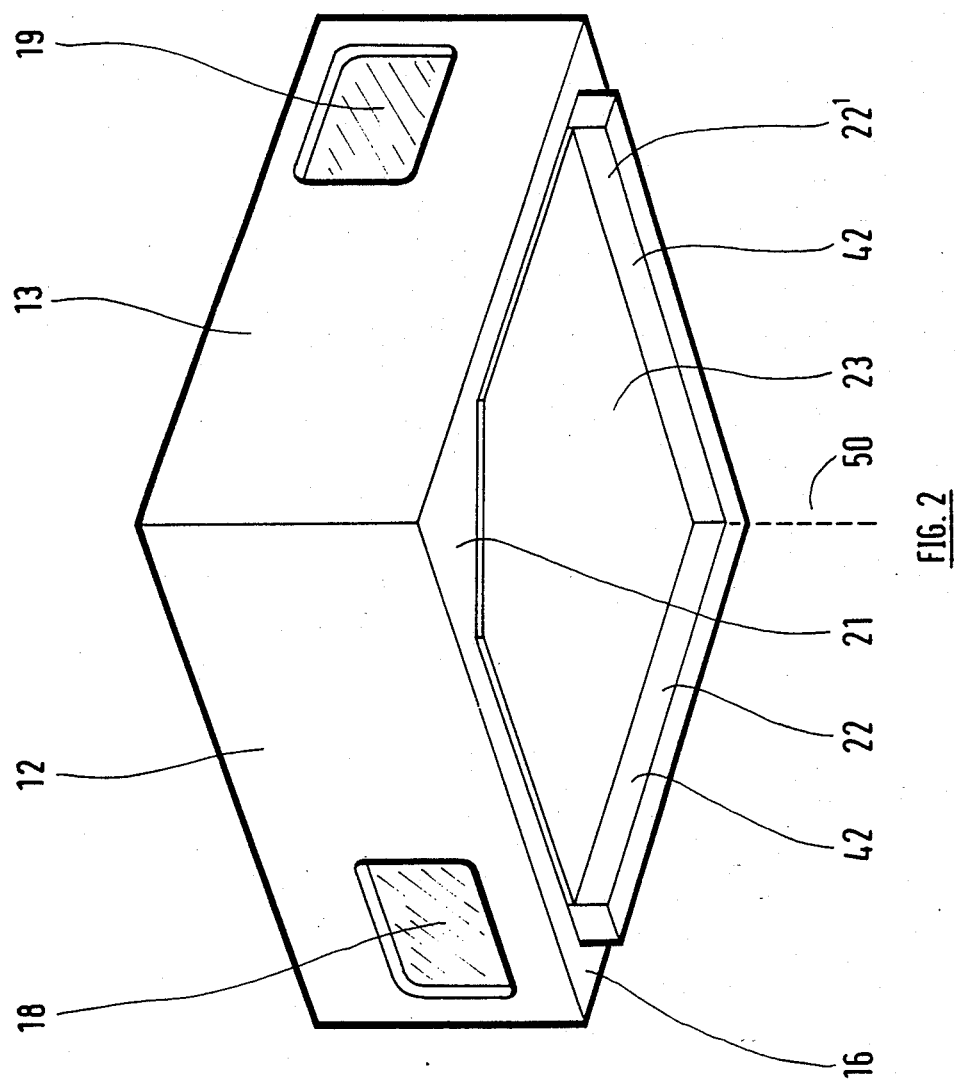
FIG. 2, is an underneath perspective view of the optical square instrument of FIG. 1.
Figure 3:
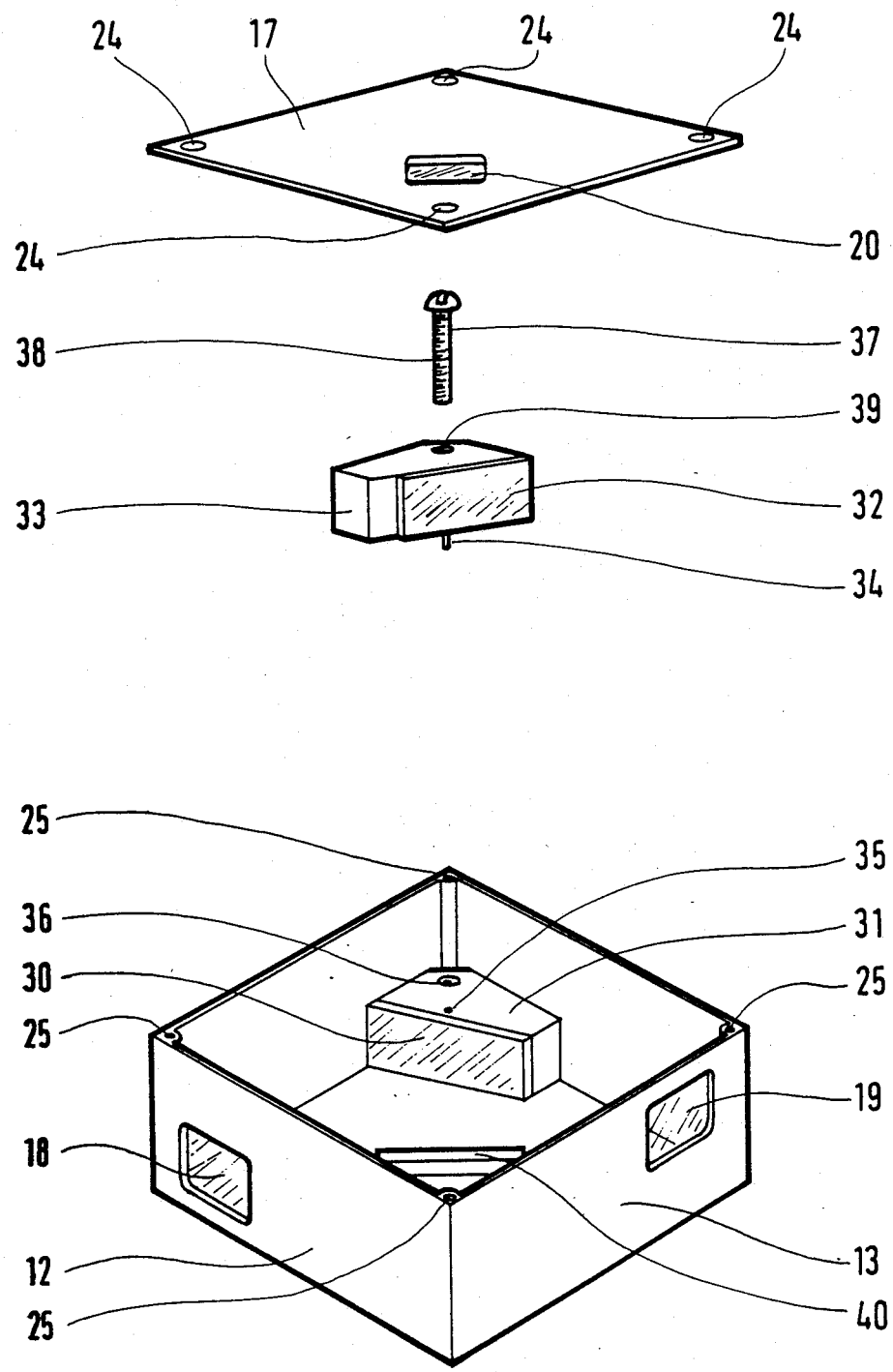
FIG. 3, is an exploded perspective view of the optical square instrument of FIG. 1.
Figure 4:
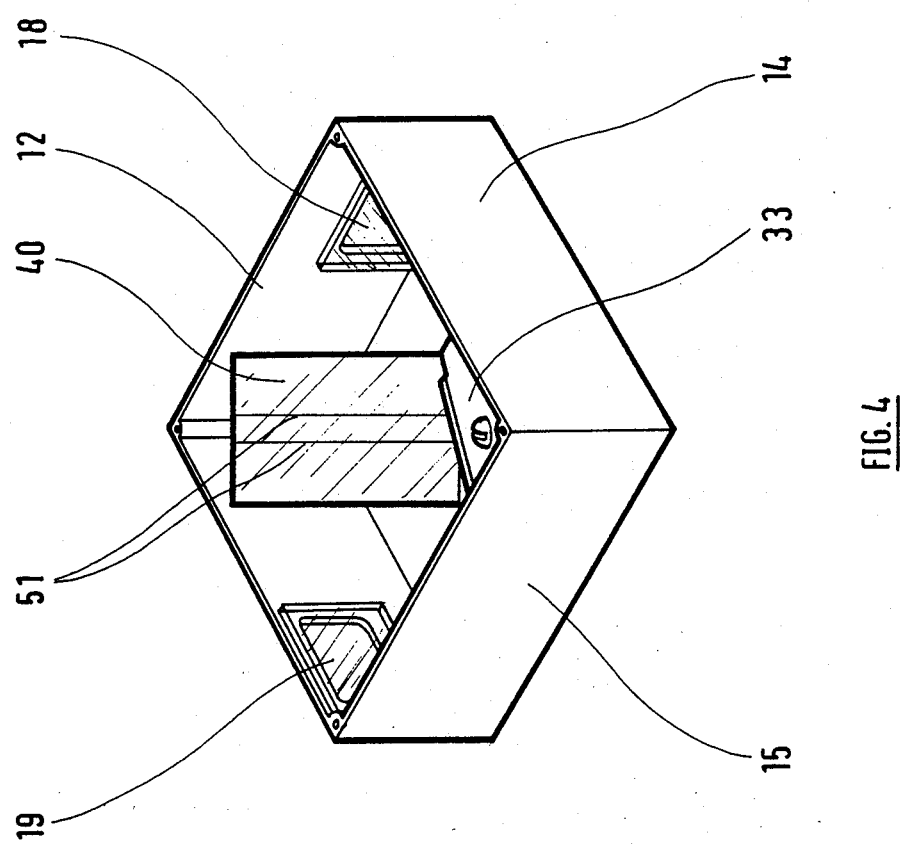
FIG. 4, is a top perspective view of the optical square instrument of FIG. 1 with the top of the housing removed.
Figure 5:
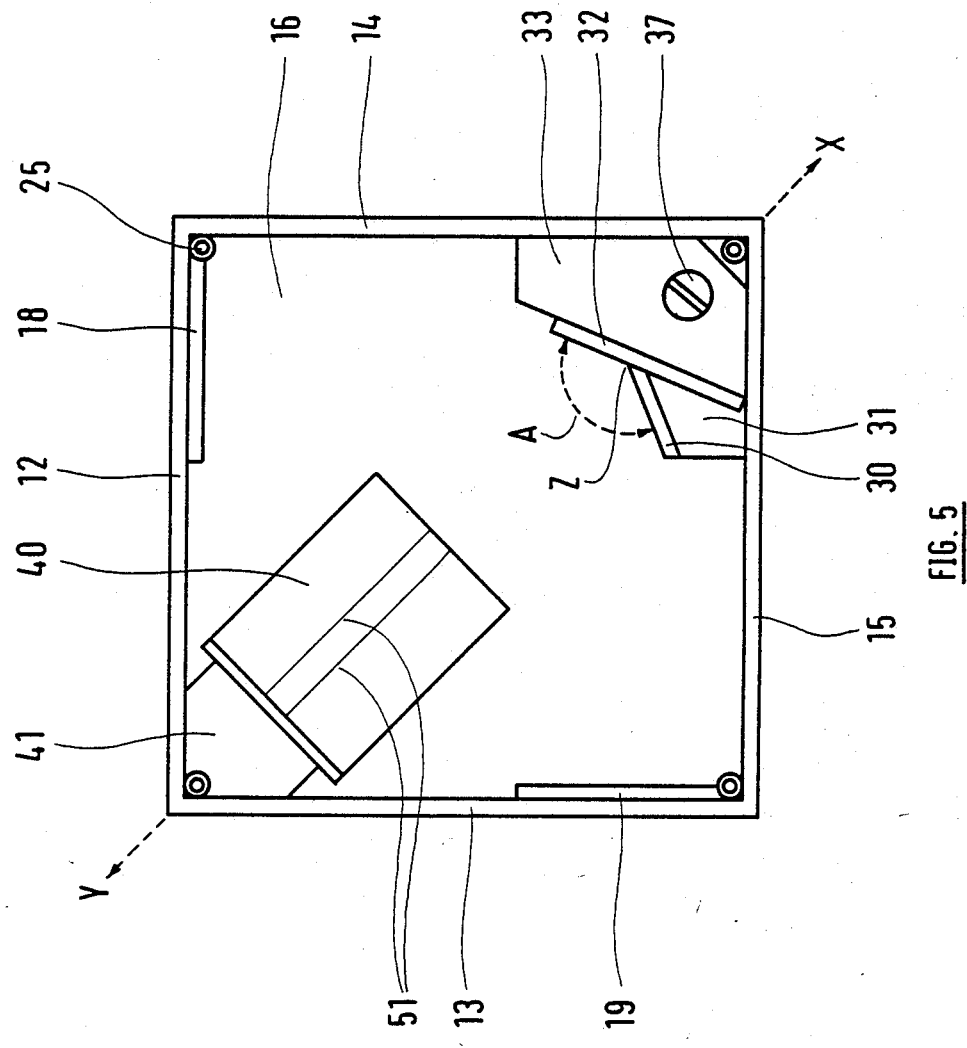
FIG. 5, is a top plan view of the optical square instrument of FIG. 4.

Referring now to the drawings wherein similar numerals have been used to indicate like parts there is shown therein a precision optical square instrument generally indicated at 10 according to the invention. The optical square instrument 10 comprises a substantially hollow housing 11 which is square when viewed in plan, and comprises a body including sidewalls 12,13,14 and 15, a base 16, together with a top 17. The sidewalls 12,13 each have a perspex or glass viewing window 18,19 respectively fixed therein with the window 19 being at a slightly higher position than the window 18, the reason for which is described below. The viewing windows are located at 90° relative to each other. The top 17 also has a viewing window 20. The underside 21 of the base 16 has two locating arms 22,22' arranged perpendicular to each other, with the arm 22 also being perpendicular to the sidewall 12 and the arm 22' being perpendicular to the sidewall 13. A sheet of rubber or plastics 23 is fixed to the underside of the base 16 in the region between the locating arms 22,22'.

The top 17 is fixed to the body by means of screws (not shown) which engage in apertures 24 in the top 17, and corresponding holes 25 at the corners of the housing 11.

A first or lower mirror 30 is fixed to a base support 31 which is fixed to the base 16 inside the housing 11. The mirror 30 is arranged perpendicular to the base 16. A second or upper mirror 32 is also fixed to a base support 33 which is arranged to be fixed on top of the base support 31 so that the mirror 32 is also located perpendicular to the base 16 but obliquely relative to the mirror 30. A locating pin 34 projecting downwardly from the underside of base support 33 is received in a correspondingly located hole 35 in the base support 31. The base support 31 has a screw threaded hole 36 for receiving a screw 37 the shank 38 of which passes through a larger hole 39 in the base support 33 of the upper mirror 32. The upper and lower mirrors 30,32 are fixed one on top of the other by means of the screw 37 at an inclusive angle A of 135 relative to each other. With the screw 37 loosened, the base support 33 can rotate very slightly on the base support 31 around the axis of the locating pin 34, which is desirable when the instrument is being assembled so that the angle of the mirrors 30,32 relative to each other can be slightly adjusted and precisely obtained This provides an adjustment which may be desirable to offset deviations which may arise due to manufacturing tolerances.

A third mirror 40 which is elongate is also located in the housing 11 and is mounted on a base support 41 which is fixed to the base 16 of the housing. The mirror 40 is inclined at an angle of 45° to the base 16. The longitudinal center line of the mirror 40 lies on a notional vertical plane passing through a diagonal X-Y of the housing. Also, a notional vertical line Z passing through the intersection of the planes of the lower and upper mirrors 30,32 lies in the notional vertical plane passing through the diagonal X-Y. Furthermore, the notional vertical line of intersection Z of the mirrors 30,32 is coincident with the vertical line of intersection 50 of the inner surfaces 42 of the locating arms 22,22'. The mirror 40 has a pair of hair-lines 51 formed therein and equally spaced about the longitudinal axis of the mirror 40. The window 20 in the top 17 of the housing is located directly over the mirror 40. In the construction as described, the upper mirror 32 views an image through the window 19 and reflects this image onto the mirror 40 which in turn reflects the image vertically upwards through the window 20 to be viewed by a user. Similarly, the lower mirror 30 views an image through the window 18 and reflects this image onto the mirror 40 which reflects the image vertically upwards through the window 20 to be viewed by a user. Therefore, the images viewed by a user looking vertically downwardly through the window 20 are the images reflected by the mirrors 30,32 which will be seen one on top of the other.

Referring to FIG. 6, in use, if the instrument is to be used to set out blockwork, a first line 60 is established by conventional methods. A building block 61 is placed at a corner where it is desired to establish a line perpendicular to the first line 60. The longer side 62 of the block 61 is placed along the first line 60 with the shorter side 63 of the block located along the eventual line 64 perpendicular to the first line 60. The instrument 10 is then placed on a corner of the block 61 as shown, with the window 18 viewing along the line 60 and the window 19 viewing in the direction parallel to the shorter side 63 of the block. The instrument 10 is located on the block 61 so that the inner surface 42 of the locating arm 22 abuts the side 62 of the block 61 and the inner surface 42 of the locating arm 22' abuts the shorter side 63 of the block with the notional vertical line of intersection 50 of the inner surfaces 42 coinciding with the edge 65 of the block 61. The rubber or plastics sheet 23 on the underside 16 of the housing 11 provides a friction grip for the instrument on the block surface.

A second block 66 is located along the first line 60 about 8 meters from the edge 65 of the first block 61 along the line of sight of the window 18. A profile member 67 is secured to the first block 61 by means of a suitable clamp 59. The profile member 67 comprises an elongate slat having an outwardly projecting locating arm 68 at its lower end. The profile member 67 is secured to the block 66 with the locating arm 68 abutting the longer side 69 of the block 66. The profile member 67 is painted on the surface 70 with two dissimilar colors 71,72, so that when secured in place to the block 66, the center line 73 coincides with the outermost corner 74 of the block 66. Also, the profile member 67 has a spirit level (not shown) suitably fixed thereto so that a user can determine when the profile member 67 is positioned vertically.

A second profile member 67' similar to profile member 67 is located along the line of sight of the window 19 of the instrument and about 6 meters from the edge 65 of the block 61 as shown It will be noted from FIG. 6 that profile member 67' is effectively a mirror image of profile member 67. In FIG. 6 another block 66' has been shown to which the second profile member 67' is secured, however, in practice the profile member 67' may simply be manually held vertically if desired.

The images of the profile members 67,67' are viewed by a user through the window 20 in the top 17 of the instrument 10. The image 80 of the first profile member 67 is reflected by the lower mirror 30 onto the mirror 40 which is viewed by the user. The image 81 of the second profile member 67' is also reflected by the upper mirror 32 onto the mirror 40. The images 80,81 as seen by the user are indicated in FIGS. 7a to 7d with the images in FIGS. 7a and 7b indicating that the profile members 67,67' lie on notional perpendicular lines 60,64 by the alignment of the center lines 73,73' of the profile members, and the images in FIGS. 7c and 7d indicating that the profile members are not arranged perpendicularly. The profile member 67' is thus moved from side to side transversely of the viewing direction of window 19 until the correct image is seen by the user, indicated by the alignment of the images as illustrated in FIGS. 7a or 7b. The perpendicularity of the lines 60,64 can further be checked by measuring the hypotenuse of the notional triangle joining blocks 61, 66 and 66'.

The two lines 51 on the mirror 40 will also be seen when the user views the mirror 40 and provide a guide for the user to determine the center line of the mirror 40 for the coincidental alignment of the center lines of the profile members.

It will be understood that in another embodiment of the invention each of the mirrors may be replaced by a suitable reflecting prism The advantage of the invention is that lines and planes can quickly be established which are respectively perpendicular to reference lines and planes. The invention is simple and inexpensive to manufacture and is readily used by unskilled people.

I claim:

1. A precision optical square instrument for accurately determining lines and planes respectively perpendicular to reference lines and planes comprising, a substantially hollow housing containing a first and second reflecting means arranged at different vertical positions for viewing, each in a respective substantially horizontal direction, first and second marker positions outside the housing which are substantially at right angles to each other, and projecting images of the two marker positions onto third reflecting means which is viewed by a user, such that the user can determine when the two marker positions are located perpendicularly, by the alignment of the images viewed in the third reflecting means, wherein the first and second reflecting means are mounted vertically on top of each other in the housing, and wherein the upper and lower reflecting means are mounted at an angle of approximately 135° relative to each other, the upper reflecting means arranged to view an image through a first window in a sidewall of the housing, the lower reflecting means arranged to view an image through a second window in a sidewall of the housing, the first and second windows being arranged at approximately 90° to each other.

2. An instrument as claimed in claim 1 wherein said reflecting means are mirrors.

3. An instrument as claimed in claim 1 wherein each mirror is mounted on a base support.

4. An instrument as claimed in claim 1 wherein the third reflecting means comprises a third mirror.

5. An instrument as claimed in claim 4 wherein the third mirror is elongate and is mounted on a base support which is fixed to the base of the housing, the third mirror arranged at approximately 45° to the base of the housing to project the images reflected by the upper and lower mirrors, vertically upwards.

6. An instrument as claimed in claim 5 wherein the housing includes a viewing window on its topmost surface to enable viewing of the third mirror by a user.

7. An instrument as claimed in claim 5 wherein the housing is square in shape, when viewed in plan, and the longitudinal center line of the third mirror and a notional vertical line passing through the intersection of the planes of the upper and lower mirrors, lie in a notional vertical plane passing through a diagonal of the housing.

8. An instrument as claimed in claim 7 wherein the underside of the housing has two locating arms arranged perpendicularly to each other, the vertical line of intersection of the inner surfaces of the locating arms lying on the notional vertical line of intersection of the planes of the upper and lower mirrors.

9. An instrument as claimed in claim 3 wherein the base support of the lower mirror has a hole for receiving a locating pin mounted on the underside of the base support for the upper mirror, and the base support for the lower mirror also has a screw threaded hole for receiving a screw the shank of which passes through a larger hole in the base support for the upper mirror, such that a slight angular adjustment of the upper mirror relative to the lower mirror is possible.

* * * * *